(12) United States Patent
Kaczmarski et al.

(10) Patent No.: US 7,945,676 B2
(45) Date of Patent: May 17, 2011

(54) PROCESSING REQUESTS TRANSMITTED USING A FIRST COMMUNICATION PROTOCOL DIRECTED TO AN APPLICATION THAT USES A SECOND COMMUNICATION PROTOCOL

(75) Inventors: Michael Allen Kaczmarski, Tucson, AZ (US); Sumant Padbidri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/076,609

(22) Filed: Mar. 10, 2005

(65) Prior Publication Data

US 2006/0206614 A1 Sep. 14, 2006

(51) Int. Cl.
*G06F 15/16* (2006.01)
(52) U.S. Cl. ............ 709/227; 709/228
(58) Field of Classification Search .......... 709/227, 709/228
See application file for complete search history.

(56) References Cited

U.S. PATENT DOCUMENTS

| | | | |
|---|---|---|---|
| 6,219,707 B1 | 4/2001 | Gooderum et al. | |
| 6,332,195 B1 | 12/2001 | Green et al. | |
| 6,389,464 B1 | 5/2002 | Krishnamurthy et al. | |
| 6,728,884 B1 | 4/2004 | Lim | |
| 6,785,730 B1 | 8/2004 | Taylor | |
| 2003/0167356 A1* | 9/2003 | Smith et al. | 709/328 |
| 2003/0172127 A1* | 9/2003 | Northrup et al. | 709/219 |
| 2003/0204601 A1 | 10/2003 | Takano | |
| 2004/0019690 A1 | 1/2004 | Cardno et al. | |

FOREIGN PATENT DOCUMENTS

| | | |
|---|---|---|
| DE | 10260926 A | 7/2004 |
| FR | 2819131 A | 7/2002 |
| JP | 2003030064 | 1/2003 |
| JP | 2003324484 | 11/2003 |
| JP | 2004192358 | 7/2004 |
| JP | 2005309974 | 11/2005 |
| WO | 0122678 A | 3/2001 |
| WO | 01 99361 A | 12/2001 |

OTHER PUBLICATIONS

PCT International Preliminary Report on Patentability mailed Dec. 7, 2006 for PCT/EP2006/060263 filed Feb. 24, 2006.
Invitation Pursuant to Article 94(3) and Rule 71(1) EPC dated Jan. 2, 2008 for Application No. 06 708 506.8-1244.

(Continued)

*Primary Examiner* — Tonia L Dollinger
*Assistant Examiner* — Mark D Fearer
(74) *Attorney, Agent, or Firm* — David W. Victor; Konrad Raynes and Victor LLP

(57) ABSTRACT

Provided are a method, system, and program for processing requests transmitted using a first communication directed to an application that uses a second communication protocol. A request is received from a client over a network in a first communication protocol. A determination is made as to whether the request includes an identifier of an application indicated in a data structure. A socket is processed that enables communication between the application identified by the identifier in response to determining that the identifier included in the request is indicated in the data structure. The socket is provided to the application associated with the requested resource to enable the application to communicate with the client over the network using a second communication protocol.

31 Claims, 5 Drawing Sheets

OTHER PUBLICATIONS

Response to Invitation Pursuant to Article 94(3) and Rule 71(1) EPC dated Feb. 26, 2008 for Application No. 06 708 506.8-1244.

V. Cardellini et al., "The State of the Art in Locally Distributed Web-Server Systems", ACM Computing Surveys, vol. 34, No. 2, Jun. 2002, pp. 263-311.

Invitation to Pay Additional Fees/Communication Relating to the Results of the Partial International Search, for application No. PCT/EP2006/060263, filed Feb. 24, 2006.

International Search Report and Written Opinion dated Jul. 14, 2006, for application No. PCT/EP2006/060263, filed Feb. 24, 2006.

Response to Written Opinion dated Jul. 26, 2006, for application No. PCT/EP2006/060263, filed Feb. 24, 2006.

PCT Demand dated Jul. 26, 2006, for application No. PCT/EP2006/060263, filed Feb. 24, 2006.

Abstract and Machine Translation for JP2005309974, published Nov. 4, 2005, 41 pages.

Abstract and Machine Translation for JP2003030064, published Jan. 31, 2003, 32 pages.

Abstract for JP2003324484, published Nov. 14, 2003, 1 page.

Abstract and Machine Translation for JP2004192358, published Jul. 8, 2004, 41 pages.

Information Materials for IDS, dated Aug. 17, 2010, 1 page.

\* cited by examiner

Application Registry Entry

PROCESSING REQUESTS TRANSMITTED USING A FIRST COMMUNICATION PROTOCOL DIRECTED TO AN APPLICATION THAT USES A SECOND COMMUNICATION PROTOCOL

BACKGROUND OF THE INVENTION

1. Field of the Invention

The present invention relates to a method, system, and program for processing requests transmitted using a first communication protocol directed to an application that uses a second communication protocol.

2. Description of the Related Art

A server machine may host a Hypertext Transport Protocol (HTTP) server application to process HTTP requests from HTTP clients on a port. The server machine may also provide access to non-HTTP applications and services on ports other than the port used for HTTP requests. The complexity of managing a firewall having multiple ports increases as the number of ports increases. Further, maintaining multiple ports open on a server machine subjects the server machine to additional points of access to hackers and other security threats.

SUMMARY

Provided are a method, system, and program for processing requests transmitted using a first communication directed to an application that uses a second communication protocol. A request is received from a client over a network in a first communication protocol. A determination is made as to whether the request includes an identifier of an application indicated in a data structure. A socket is processed that enables communication between the application identified by the identifier in response to determining that the identifier included in the request is indicated in the data structure. The socket is provided to the application associated with the requested resource to enable the application to communicate with the client over the network using a second communication protocol.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
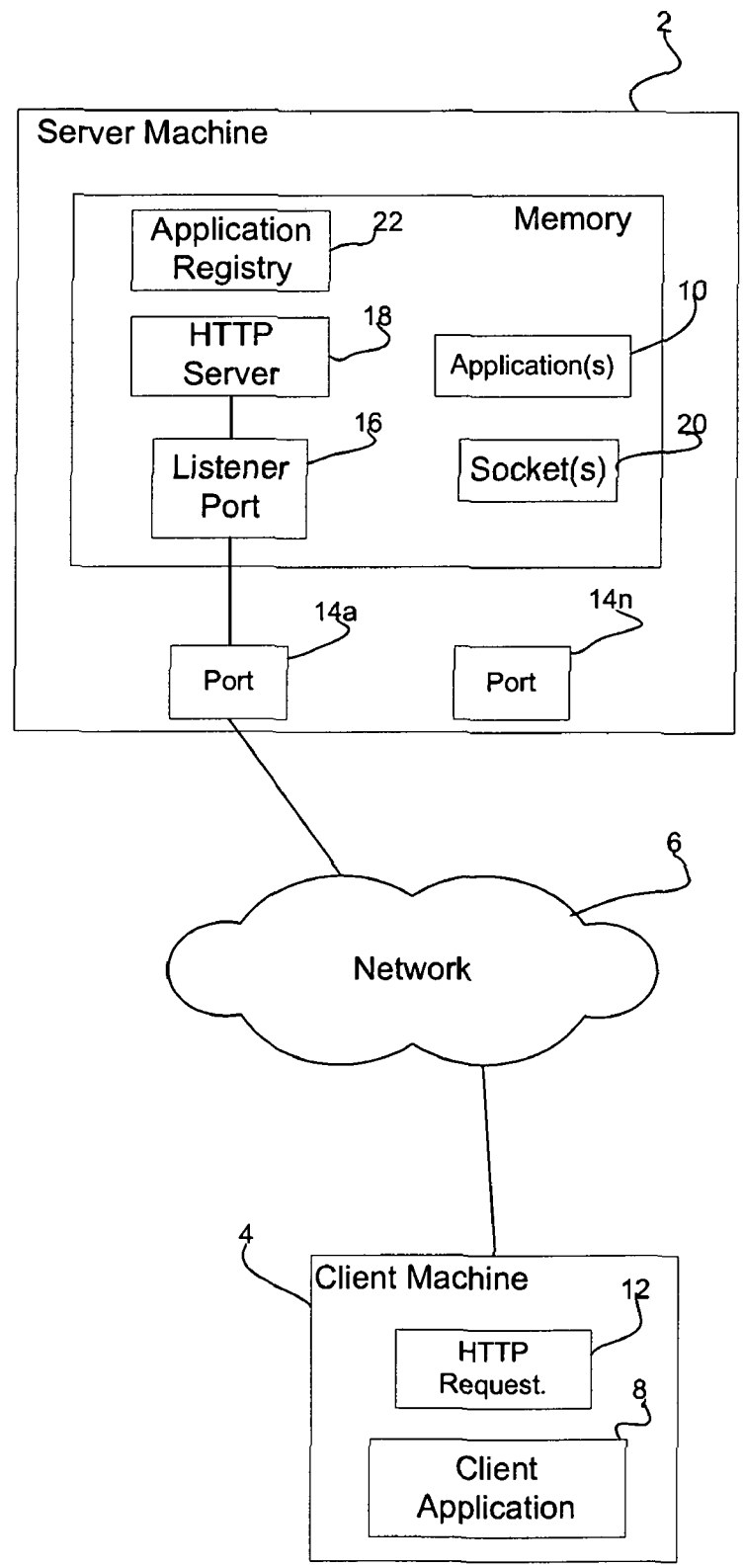
FIG. 1 illustrates an embodiment of a network computing environment.

FIG. 1 illustrates a network computing environment including a server machine 2 and client machine 4 that communicate over a network 6. There may be multiple client machines 4 that communicate over the network 6 with the server machine. The client machine 4 includes a client application 8 that intends to communicate with a server application 10. The client-server application may comprise a database application, backup storage management program, or other client-server applications known in the art. To initiate communication with the server application, the client application 8 generates a Hypertext Transport Protocol (HTTP) request 12 and communicates this request using the HTTP protocol. However, following this initial HTTP request 12, subsequent communication between the client application 8 and server application 10 involves the use of an application layer communication protocol known in the art other than HTTP, such as Simple Network Management Protocol (SNMP), Simple Mail Transfer Protocol (SMTP), File Transfer Protocol (FTP), Telnet, and any TCP/IP based interaction between the client application 8 and server application 10. The server machine 2 and client machine 4 also use a transport layer protocol, network layer protocol, and data link layer protocol to communicate over the network. The application layer enables common communication of application services for the application 10, 12 processes and provides semantic conversion between associated application processes.

The server machine 2 includes one or more ports 14a, 14n, where the ports 14a, 14b represent physical connections on one or more network adaptors (not shown), and a memory 14. The memory 14 includes the application(s) 10, a listener port 16, an HTTP server 18, communication sockets 20, and an application registry 22. The listener port 16 comprises a program that monitors one port, e.g., 14a, for inbound communications in the HTTP protocol directed to the HTTP server 18. The HTTP server 18 handles HTTP requests and provides responses to requests. The communication sockets 20 comprise a programming construct used to send and receive information over a network connection, e.g., 6. When listening on a port, the application 10 accepts a connection by receiving a socket from the listener port 16 when an inbound connection is made. Similarly, when the client application 8 wants to create a connection to a remote program, e.g., application 10, the client application 8 creates a socket, specifying the target address and port number and opens the socket to create the connection. After the client application or server application closes the connection the socket is gone and the next inbound connection on the port will return a new socket for the program to use for the connection. There may be one socket 20 for each server application 10 having an active communication link with one client application 8 in one client machine 4 over the network 6. The socket 20 may maintain information such as the client machine 4 network address, e.g., an Internet Protocol (IP) address, the transport layer protocol, e.g., TCP, and a port 14a, 14n number. In this way, the server application 10 uses the socket 20 to direct communications to the client application 8. The socket 20 enables communication between the server 10 and client 8 applications over the network 6 using an application layer protocol other than HTTP, i.e., the application layer protocol used for the initial communication.

The client machine 4 may comprise a computational device known in the art, such as a server, desktop computer, workstation, mainframe, hand held computing device, telephony device, etc. capable of communicating over the network 6 with the server machine 2. The server machine 2 may comprise a suitable server system known in the art to manage backup messages from multiple systems. The network 6 may comprise one or more networks known in the art, such as a Wide Area Network (WAN), Local Area Network (LAN), Storage Area Network (SAN), wireless network, the Internet, and Intranet, etc.

In one embodiment, the applications 10 may comprise legacy applications that utilize older legacy application layer protocols that are not handled by the HTTP server 18.

Figure 2:
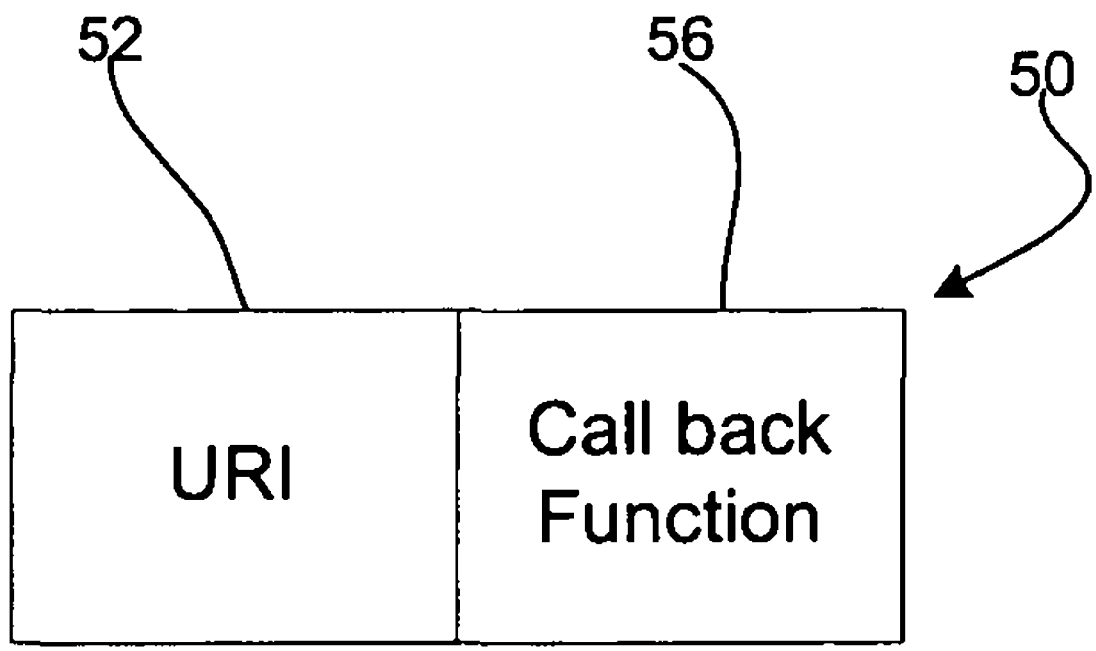
FIG. 2 illustrates an embodiment of an entry for a registered application.

FIG. 2 illustrates an entry 50 in the application registry 22 maintained for each application 10 communicating using an application layer protocol other than HTTP. The entry 50 includes a Uniform Resource Identifier (URI) 52 of the application 10, i.e., the application 10 name and a call back function 12 that may be called with the socket 20 to handoff the request from the client application 8 to initiate communication with the server application 10.

Figure 3:
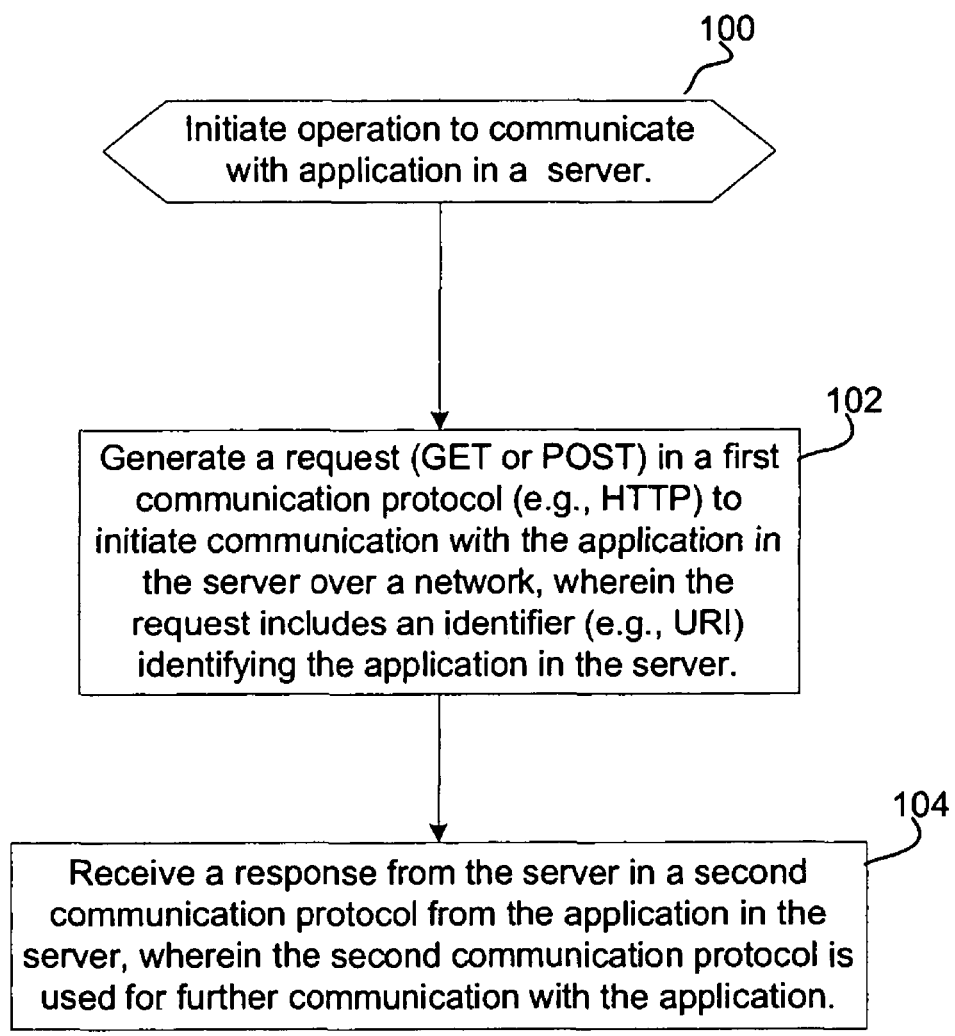
FIGS. 3, 4, and 5 illustrate an embodiment of operations to process client requests in a server.

FIG. 3 illustrates operations performed by the client application 8 to initiate communication with the server application 10. To initiate (at block 100) operations to communicate with a server application 10, the client application 8 generates (at block 102) a request 12 (GET or POST) in a first communication protocol (e.g., HTTP) to initiate communication with the server application 10 over the network 6. The HTTP request 12 includes an identifier (e.g., URI) identifying the target server application 10. As discussed, although the client application 8 and server application 10 may communicate using an application layer protocol other than HTTP, such as a legacy application layer protocol, the initial communication request 12 comprises an HTTP request 12. If the initial HTTP request 12 is processed successfully at the server machine 2, then the client application 8 receives (at block 104) a response from the server application 10 in a second communication protocol, i.e., an application layer protocol other than HTTP. This non-HTTP application layer protocol is used during subsequent communications between the client 8 and server 10 applications during the session initialized with the HTTP request 12.

Figure 4:
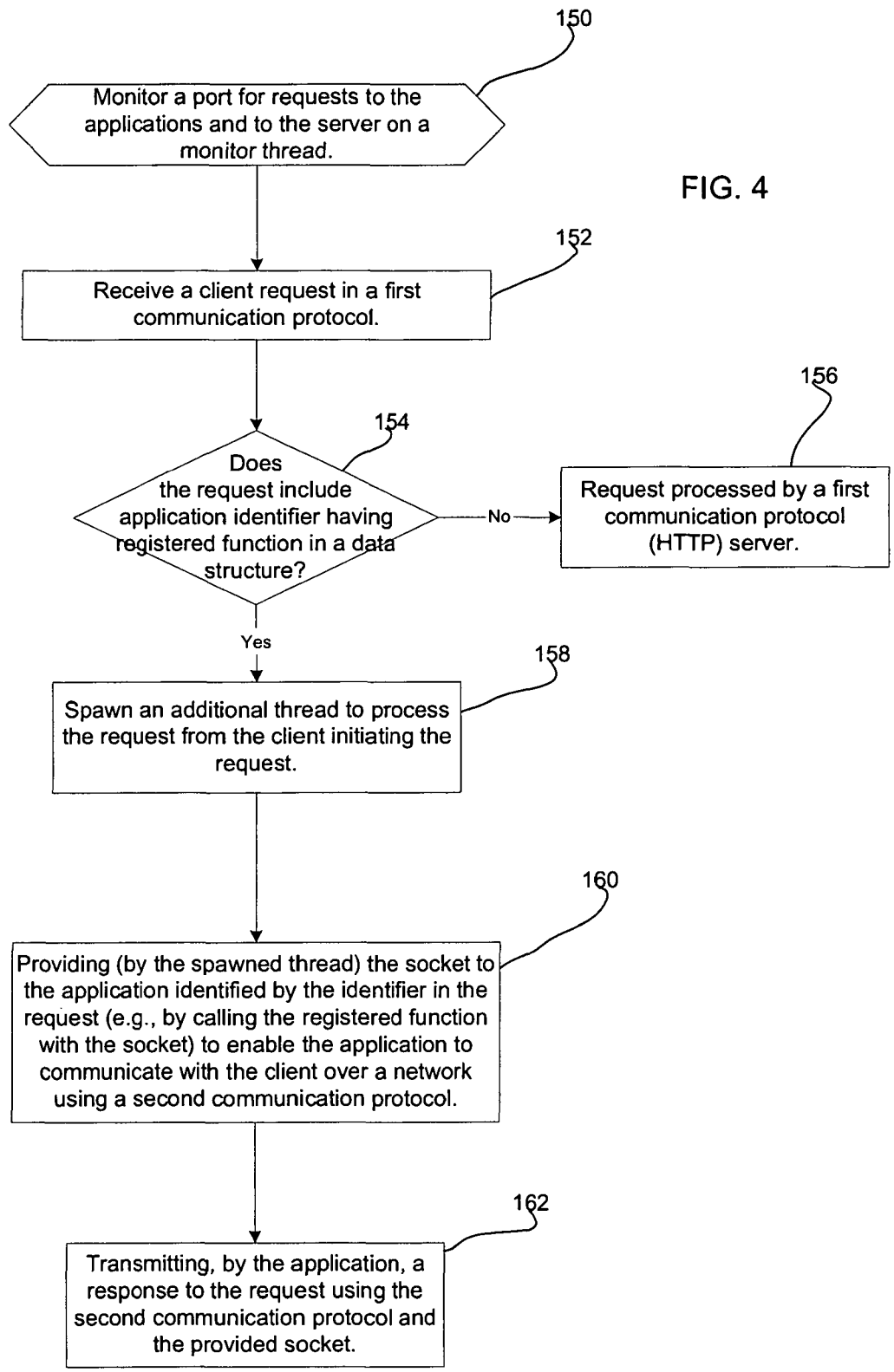

FIG. 4 illustrates an embodiment of operations performed in the server machine 2 to establish a connection between one server application 10 and the client application 8 which use a communication protocol, i.e., application layer protocol, other than HTTP (i.e., the application layer protocol used to establish the initial link). At block 150, the listener port 16 monitors, on a monitor thread, one port, e.g., 14a, for requests to the applications 10 and the HTTP server 18. Upon receiving (at block 152) a client request, e.g., HTTP request 12, in the first communication (application layer) protocol, the listener port 16 determines (at block 154) whether there is a registered function 50 (FIG. 2) for the application identified in the request in a data structure, i.e., the application registry 22. If not, then the request is processed as a normal HTTP request by a first communication protocol, e.g., (HTTP), server. Such requests are not intended for one of the applications 10. If (at block 154) the HTTP request 12 includes a registered application identifier in the application registry 22, then an additional thread may be spawned (at block 158) to process the request from the client application 8 initiating the HTTP request 12. By spawning an additional thread, the main thread on which the listener port 16 executes can return to listening on the port 14a, 14b for an additional connection. In an alternative embodiment, threading may not be used, and then the server application 10 can only handle one connection at a time. The spawned thread further provides (at block 160) the generated socket 20 to the server application 10 identified in the request. In one embodiment, the generated socket 20 may be provided to the application 10 to enable the application to respond to the request by calling the registered callback function 52 with the socket to enable the application 10 identified in registry entry 50 (at field 54) to communicate with the client machine 4 over the network 6 using a second communication (application layer protocol) different from the first communication protocol, e.g., HTTP.

This socket enables the client 8 and server 10 applications to communicate through the same port 14a used by HTTP requested directed to the HTTP server 18 even though the client 8 and server 10 applications do not use the HTTP protocol to communicate and intend to bypass the HTTP server 18. By spawning a new thread, in one embodiment, the monitor thread executing the listener port 16 to monitor the port 14a is not burdened with having to perform the operations of generating the thread and calling the application 10 to handle communication with the requesting client application 8. In response to being invoked by the call back function, the server application 10 may transmit (at block 162) a response to the HTTP request using the second communication protocol, such as an application layer protocol other than HTTP. After this response, the client 8 and server 10 applications communicate through the sockets 20 established for application communication, which on the server side is socket 20.

Figure 5:
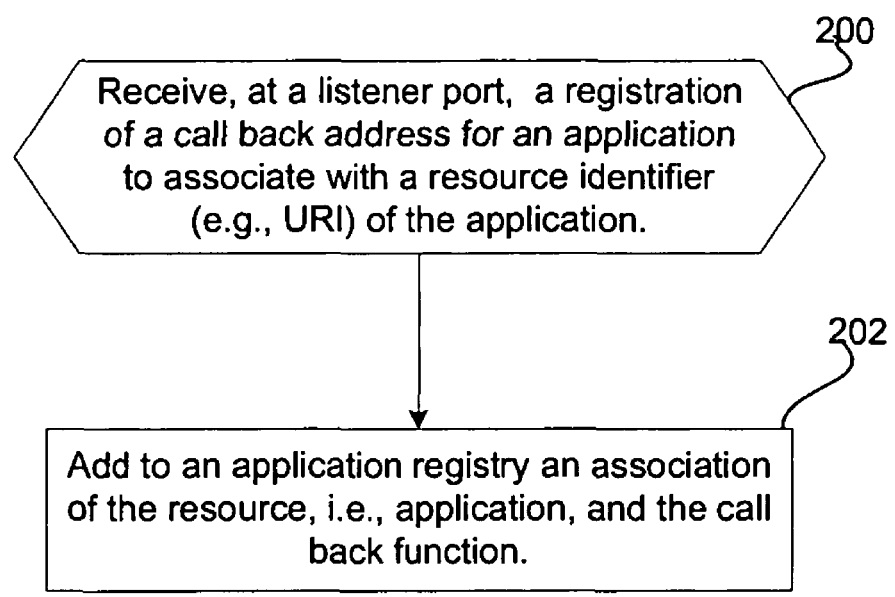

FIG. 5 illustrates operations performed by the listener port 16 to register an entry 50 (FIG. 2) for the application 10 in the application registry 22. Upon the listener port 16 receiving (at block 200) a registration of a call back address and identifier (e.g., URI) for an application 10, the listener port 16 adds (at block 202) to the application registry 22 an application registry entry 50 having the identifier, e.g., URI, of the application 10 and the call back function that the listener port 16 may use to pass the socket 20 to the application 10 to use to communicate with the client application 8 initiating the request using any other TCP/IP based application layer protocol.

In one embodiment, the use of HTTP as the initial protocol allows Web services extensions to be applied to existing TCP/IP protocols because they are "tunneled" under the initial HTTP request. For example, the Web Services (WS) Security specification extension is used to authenticate the caller or WS-Policy to route the request to the appropriate web server application server based on quality of service or other criteria. Web Services extension requests, such as WS Security extensions may be transported using the HTTP protocol and the socket handling the communication with the application initiating the Web Services request is handed to the Web services application to enable the Web Services application on the server to communicate directly with the client initiating the Web Services request using a different communication protocol, such as Simple Object Access Protocol (SOAP) messaging.

Described embodiments provide techniques to enable a server having legacy applications and a protocol server, such as an HTTP server, handling requests for more current applications to use the same port for both the legacy (non-HTTP) and non-legacy (HTTP) application requests.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, the first communication protocol comprised HTTP and the second communication protocol comprised an application layer protocol other than HTTP. In alternative embodiments the first communication protocol may comprise a communication protocol other than HTTP and the second communication protocol may comprise HTTP.

In the described embodiments, the first and second communication protocols comprised application layer protocols. In alternative embodiments, the first and second communication protocols may comprise an Open Systems Interconnection Reference Model (OSI Model) layer other than the application layer, such as one of the presentation layer, session layer, transport layer, network layer, data link layer, and physical layer.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving a request from a client over a network in a first communication protocol;
    determining whether the request includes an identifier of an application indicated in a data structure;
    processing a socket that enables communication between the application identified by the identifier in response to determining that the identifier included in the request is indicated in the data structure;
    providing the socket to the application identified in the request to enable the application to communicate with the client over the network using a second communication protocol; and
    transmitting by the application a response to the request using the second communication protocol and the provided socket, wherein the request from the client in the first communication protocol is sent to a first communication protocol server managing communication using the first communication protocol, wherein communication with the client following the response to the request is conducted using the second communication protocol and the socket and bypasses the first communication protocol server.

2. The method of claim 1, further comprising:
    passing the request from the client to the first communication protocol server in response to determining that the request does not include the identifier of one application indicated in the data structure.

3. The method of claim 2, wherein the first communication protocol comprises the Hypertext Transport Protocol (HTTP) protocol, the first communication protocol server comprises an HTTP server, the identifier comprises a Uniform Resource Indicator (URI), and the second communication protocol comprises an application layer protocol other than HTTP.

4. The method of claim 3, wherein the request comprises an HTTP GET or POST request.

5. The method of claim 2, wherein a plurality of identifiers, each identifying one application, are indicated in the data structure, wherein communication may be initiated with the applications whose identifiers are indicated in the data structure using the first communication protocol, further comprising:
    monitoring a port for requests to the applications and to the first communication protocol server.

6. The method of claim 1, wherein determining whether the identifier included in the request is indicated in the data structure comprises determining whether there is a registered function for the identifier included in the request, and wherein providing the socket to the application comprises calling the registered function with the generated socket.

7. The method of claim 1, wherein further communications from the client to the application occur through the socket using the second communication protocol.

8. The method of claim 1, further comprising:
    monitoring a port for requests in the first communication protocol on a monitor thread; and
    spawning an additional thread to generate the socket and provide the socket to the application in response to determining that the request includes the identifier of the application indicated in the data structure.

9. The method of claim 1, further comprising:
    receiving a registration of a call back function and identifier for an application; and
    indicating in the data structure an association of the application, the received call back function, and the received identifier, wherein determining whether the identifier included in the request is indicated in the data structure comprises determining whether the data structure indicates one call back faction for the identifier in the request, wherein providing the socket to the application identified by the identifier comprises calling the call back function with the generated socket as a parameter.

10. The method of claim 1, wherein the request further includes authentication information, further comprising:
    attempting to authenticate the request by processing the authentication information in the request, wherein determining whether the request includes the identifier of the application indicated in the data structure, generating the socket, and providing the socket are performed in response to authenticating the authentication information in the request.

11. The method of claim 1, wherein the application comprises a legacy application.

12. The method of claim 1, wherein the first and second communication protocols comprise different application layer protocols.

13. The method of claim 1, wherein the request is directed to a Web Services application, wherein the Web Services application is indicated in the data structure to enable the socket on which the Web Services request is received to be provided to the Web Services application to communicate with the client initiating the Web Services request using the second communication protocol.

14. A system in communication with a client over a network, comprising:
a processor;
a memory in communication with the processor and including a data structure;
a first communication protocol server using a first communication protocol;
a computer readable storage medium including code executed by the processor to perform operations, the operations comprising:
receiving a request from the client over the network in the first communication protocol;
determining whether the request includes an identifier of an application indicated in a data structure;
processing a socket that enables communication between the application identified by the identifier in response to determining that the identifier included in the request is indicated in the data structure;
providing the socket to the application identified in the request to enable the application to communicate with the client over the network using a second communication protocol; and
transmitting by the application a response to the request using the second communication protocol and the provided socket, wherein communication with the client following the receiving of the response is conducted using the second communication protocol and the socket to bypass the first communication protocol server.

15. The system of claim 14, wherein the operations further comprise passing the request from the client to the first communication protocol server in response to determining that the request does not include the identifier of one application indicated in the data structure.

16. The system of claim 15, wherein the first communication protocol comprises the Hypertext Transport Protocol (HTTP) protocol, the first communication protocol server comprises an HTTP server, the identifier comprises a Uniform Resource Indicator (URI), and the second communication protocol comprises an application layer protocol other than HTTP.

17. The system of claim 15, wherein a plurality of identifiers, each identifying one application, are indicated in the data structure, wherein communication may be initiated with the applications whose identifiers are indicated in the data structure using the first communication protocol, wherein the operations further comprise:
monitoring a port for requests to the applications and to the first communication protocol server.

18. The system of claim 14, wherein determining whether the identifier included in the request is indicated in the data structure comprises determining whether there is a registered function for the identifier included in the request, and wherein providing the socket to the application comprises calling the registered function with the generated socket.

19. The system of claim 14, wherein the operations further comprise:
monitoring a port for requests in the first communication protocol on a monitor thread; and
spawning an additional thread to generate the socket and provide the socket to the application in response to determining that the request includes the identifier of the application indicated in the data structure.

20. The system of claim 14, wherein the operations further comprise:
receiving a registration of a call back function and identifier for an application;
indicating in the data structure an association of the application, the received call back function, and the received identifier, wherein determining whether the identifier included in the request is indicated in the data structure comprises determining whether the data structure indicates one call back faction for the identifier in the request, wherein providing the socket to the application identified by the identifier comprises calling the call back function with the generated socket as a parameter.

21. The system of claim 14, wherein the application comprises a legacy application.

22. The system of claim 14, wherein the first and second communication protocols comprise different application layer protocols.

23. An article of manufacture comprising a computer readable storage hardware medium including code executed to communicate with a client over a network, access a data structure, and cause operations to be performed, the operations comprising:
receiving a request from the client over the network in a first communication protocol;
determining whether the request includes an identifier of an application indicated in the data structure;
processing a socket that enables communication between the application identified by the identifier in response to determining that the identifier included in the request is indicated in the data structure;
providing the socket to the application identified in the request to enable the application to communicate with the client over the network using a second communication protocol; and
transmitting by the application a response to the request using the second communication protocol and the provided socket, wherein the request from the client in the first communication protocol is sent to a first communication protocol server managing communication using the first communication protocol, wherein communication with the client following the response to the request is conducted using the second communication protocol and the socket and bypasses the first communication protocol server.

24. The article of manufacture of claim 23, wherein the operations further comprise:
passing the request from the client to the first communication protocol server in response to determining that the request does not include the identifier of one application indicated in the data structure.

25. The article of manufacture of claim 24, wherein the first communication protocol comprises the Hypertext Transport Protocol (HTTP) protocol, the first communication protocol server comprises an HTTP server, and the identifier comprises a Uniform Resource Indicator (URI), and the second communication protocol comprises an application layer protocol other than HTTP.

26. The article of manufacture of claim 24, wherein a plurality of identifiers, each identifying one application, are indicated in the data structure, wherein communication may be initiated with the applications whose identifiers are indicated in the data structure using the first communication protocol, wherein the operations further comprise:

monitoring a port for requests to the applications and to the first communication protocol server.

27. The article of manufacture of claim 23, wherein determining whether the identifier included in the request is indicated in the data structure comprises determining whether there is a registered function for the identifier included in the request, and wherein providing the socket to the application comprises calling the registered function with the generated socket.

28. The article of manufacture of claim 23, wherein the operations further comprise:

monitoring a port for requests in the first communication protocol on a monitor thread; and spawning an additional thread to generate the socket and provide the socket to the application in response to determining that the request includes the identifier of the application indicated in the data structure.

29. The article of manufacture of claim 23, wherein the operations further comprise:

receiving a registration of a call back function and identifier for an application; and indicating in the data structure an association of the application, the received call back function, and the received identifier, wherein determining whether the identifier included in the request is indicated in the data structure comprises determining whether the data structure indicates one call back faction for the identifier in the request, wherein providing the socket to the application identified by the identifier comprises calling the call back function with the generated socket as a parameter.

30. The article of manufacture of claim 23, wherein the application comprises a legacy application.

31. The article of manufacture of claim 23, wherein the first and second communication protocols comprise different application layer protocols.

* * * * *